May 28, 1957 V. L. NEWHOUSE ET AL 2,794,130

MAGNETIC CORE CIRCUITS

Filed April 28, 1955 6 Sheets-Sheet 1

INVENTORS
VERNON L. NEWHOUSE AND
GEORGE R. BRIGGS
BY Morris A. Rabkin
ATTORNEY

May 28, 1957 V. L. NEWHOUSE ET AL 2,794,130

MAGNETIC CORE CIRCUITS

Filed April 28, 1955 6 Sheets-Sheet 2

INVENTORS
VERNON L. NEWHOUSE AND
GEORGE R. BRIGGS
BY Morris A. Rabkin
ATTORNEY

May 28, 1957 V. L. NEWHOUSE ET AL 2,794,130

MAGNETIC CORE CIRCUITS

Filed April 28, 1955 6 Sheets-Sheet 3

INVENTORS
VERNON L. NEWHOUSE AND
GEORGE R. BRIGGS
BY
ATTORNEY

MAGNETIC CORE CIRCUITS

INVENTORS
VERNON L. NEWHOUSE AND
GEORGE R. BRIGGS
BY Morris Rabkin
ATTORNEY

May 28, 1957 V. L. NEWHOUSE ET AL 2,794,130

MAGNETIC CORE CIRCUITS

Filed April 28, 1955 6 Sheets-Sheet 5

INVENTORS
VERNON L. NEWHOUSE AND
GEORGE R. BRIGGS
BY Morris [signature]
ATTORNEY

MAGNETIC CORE CIRCUITS

Filed April 28, 1955 6 Sheets-Sheet 6

INVENTORS
VERNON L. NEWHOUSE AND
GEORGE R. BRIGGS
BY Morris ... Rabkin
ATTORNEY

United States Patent Office 2,794,130

Patented May 28, 1957

2,794,130

MAGNETIC CORE CIRCUITS

Vernon L. Newhouse, Moorestown, and George R. Briggs, Princeton, N. J., assignors to Radio Corporation of America, a corporation of Delaware Application April 28, 1955, Serial No. 504,606

26 Claims. (Cl. 307—88)

Figure 1:
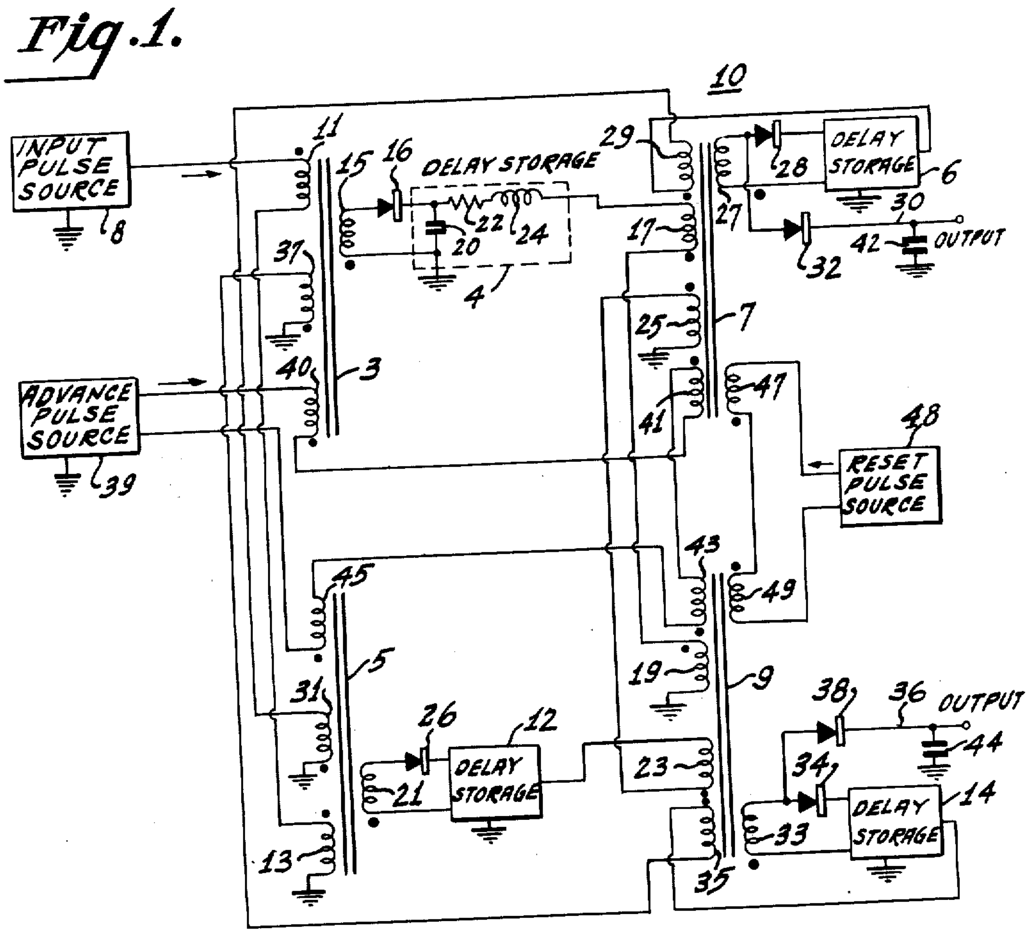

This invention relates to electrical circuits, and particularly to improved magnetic core circuits.

In the electrical art, flip-flop circuits are used, for example, in binary counters, in switching and in gating circuits. In general, a flip-flop circuit has two stable states and two corresponding outputs. The flip-flop is triggered from one stable state to the other by an input signal. An output signal is furnished on the corresponding output when the flip-flop is set to one of its stable states; the output signal may be a train of A. C. pulses when magnetic cores are used in the circuit. Magnetic core flip-flop circuits are desirable because no holding power is required to maintain a magnetic core in one or the other of two stable states. Also, magnetic cores are relatively inexpensive and can be fabricated in miniature sizes.

Extensive use is made of binary counter circuits for counting sequentially occurring pulses. Binary counter circuits may include a plurality of stages of flip-flop circuits connected in cascade. Each flip-flop circuit is triggered from one stable state to the other by an input pulse.

In the usual arrangement of binary counters there is a time lag before an indication of the count represented by one or more input pulses can be obtained. One reason for this time lag is that a finite time is required for each flip-flop circuit to trigger the next succeeding flip-flop. This sequential switching is termed in the art a "propagated carry" because the counter is switched stage by stage in response to successive pairs of input pulses. Binary counters are known which avoid a propagated carry by using a number $(n-1)$ "and" gates having $k$ inputs (where $n$ is the number of stages and $k$ is the stage number). Such an arrangement involves additional expense particularly when the counter has many stages.

An object of this invention is to provide an improved flip-flop circuit which utilizes magnetic cores.

Another object of this invention is to provide an improved flip-flop circuit which has two stable states and which can furnish a continuous train of output pulses at a selected one of two outputs.

Still another object of this invention is to provide an improved binary counter employing magnetic cores.

Yet another object of this invention is to provide a novel binary counter employing magnetic cores wherein an indication of the stored count can be obtained almost immediately after an input pulse has been applied.

A further object of this invention is to provide a novel magnetic binary counter which avoids the time lag incident to a propagated carry.

According to the invention a flip-flop circuit includes a plurality of magnetic cores. Each core is characterized by two directions of remanent magnetic induction referred to herein as the "P" and the "N" directions, respectively. Initially, a first one of the cores is driven to one of the aforementioned remanent conditions, for example, the P remanent condition. Each of the remaining cores is driven to the N remanent condition. Advance pulses are applied to advance windings each linking one of the cores. The advance pulses change the remanent condition of only the first core. The change of flux in the first core induces a voltage in an output winding of that core. An input pulse operates to excite a second one of the cores to the P remanent condition and to change the first core to the N remanent condition. The advance pulses now change the remanent condition of only the second core. The change of flux in the second core induces a voltage in a different output winding linking the second core. The second core also is returned to a P remanent state after each advance pulse by means of a delay storage means coupled to its output winding.

According to other arrangements of the invention, a plurality of the magnetic flip-flop circuits are connected in cascade to form a binary counter.

Each input pulse is applied to each counter stage. Means are provided for preventing the input pulses from changing the condition of any one stage until all the preceding stages are in a proper condition. The count is obtained from the stages by means of advance pulses. Once a count has been set in the counter a continuous indication of the count can be obtained by applying a train of advance pulses and observing the output voltage induced at the outputs of the individual stages.

Figure 2:
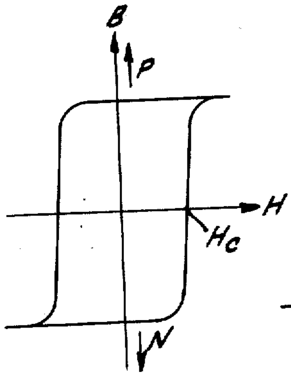
Figure 3:
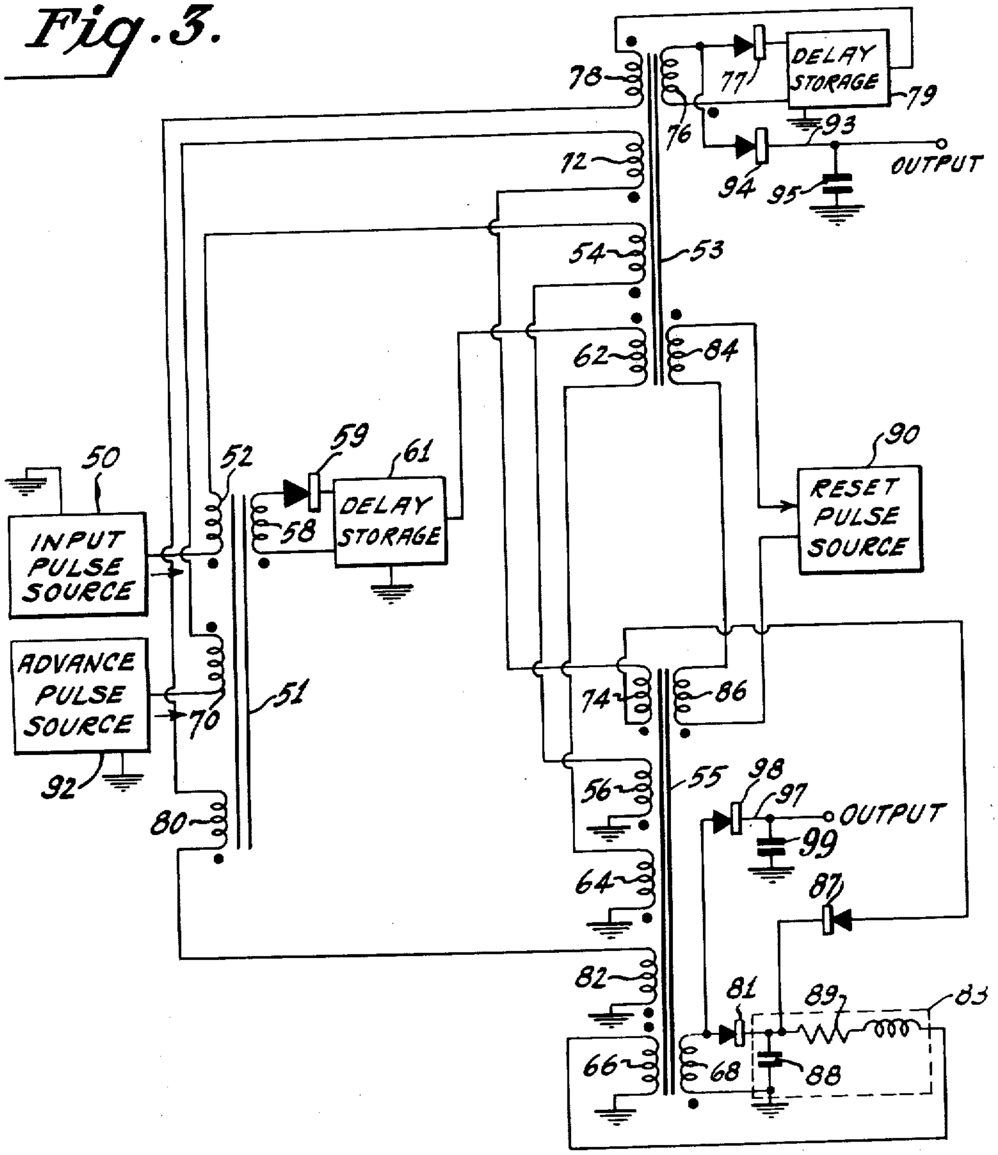
Figure 4:
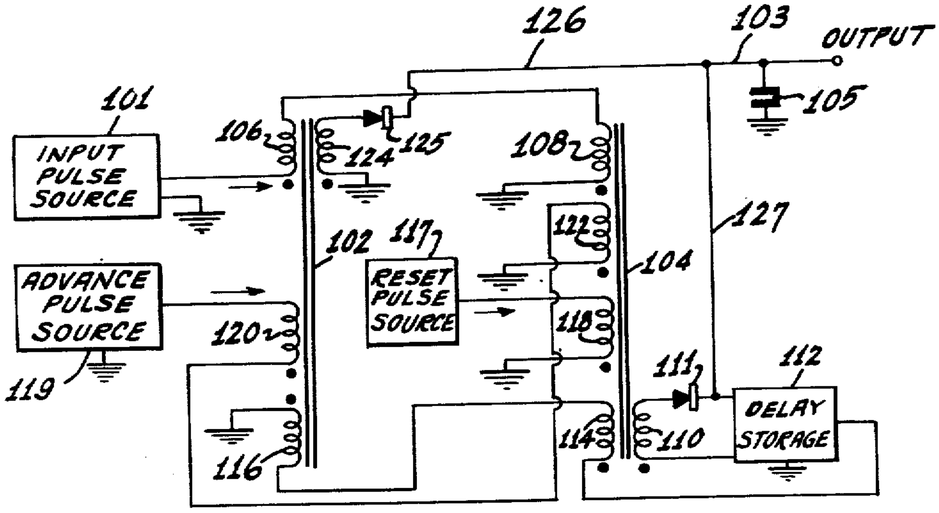
Figure 5:
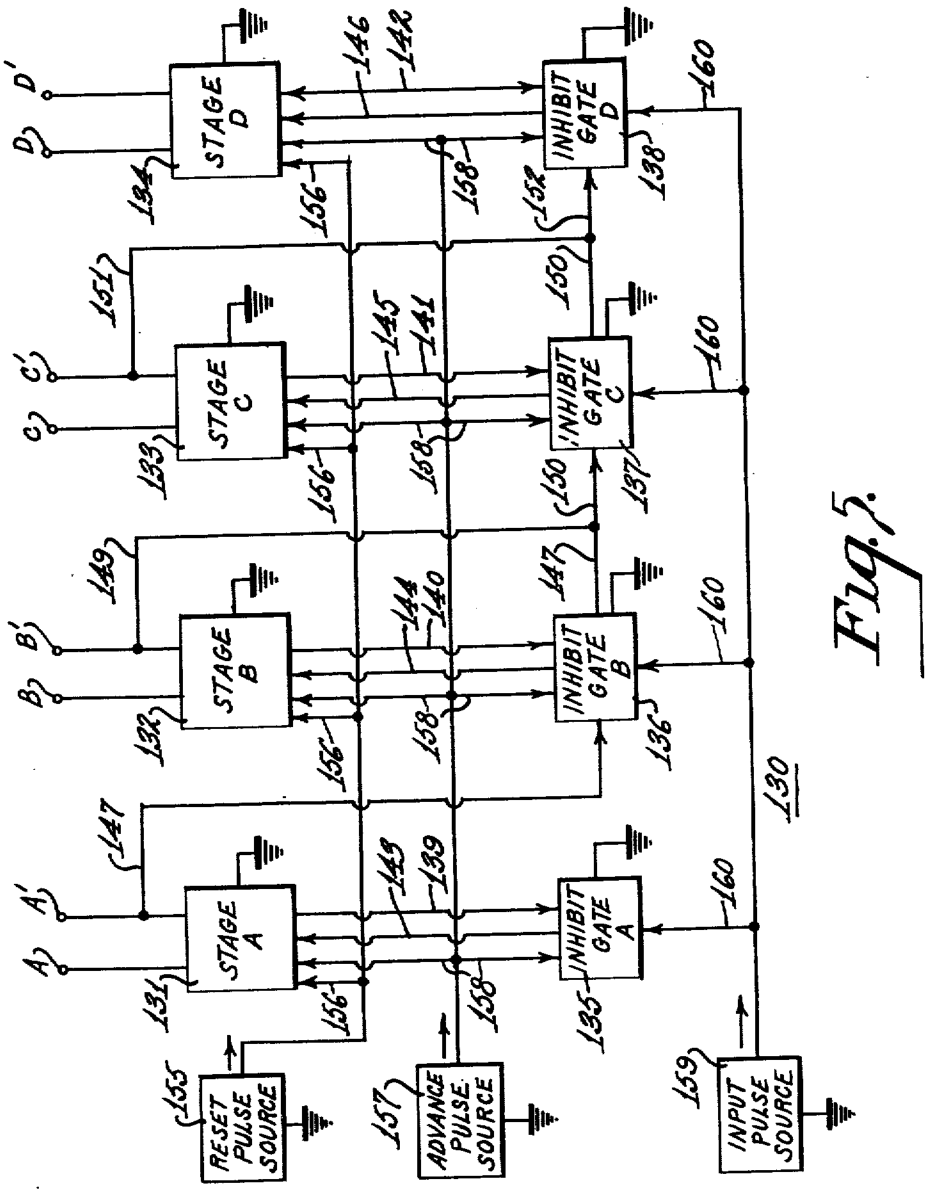
Figure 6:
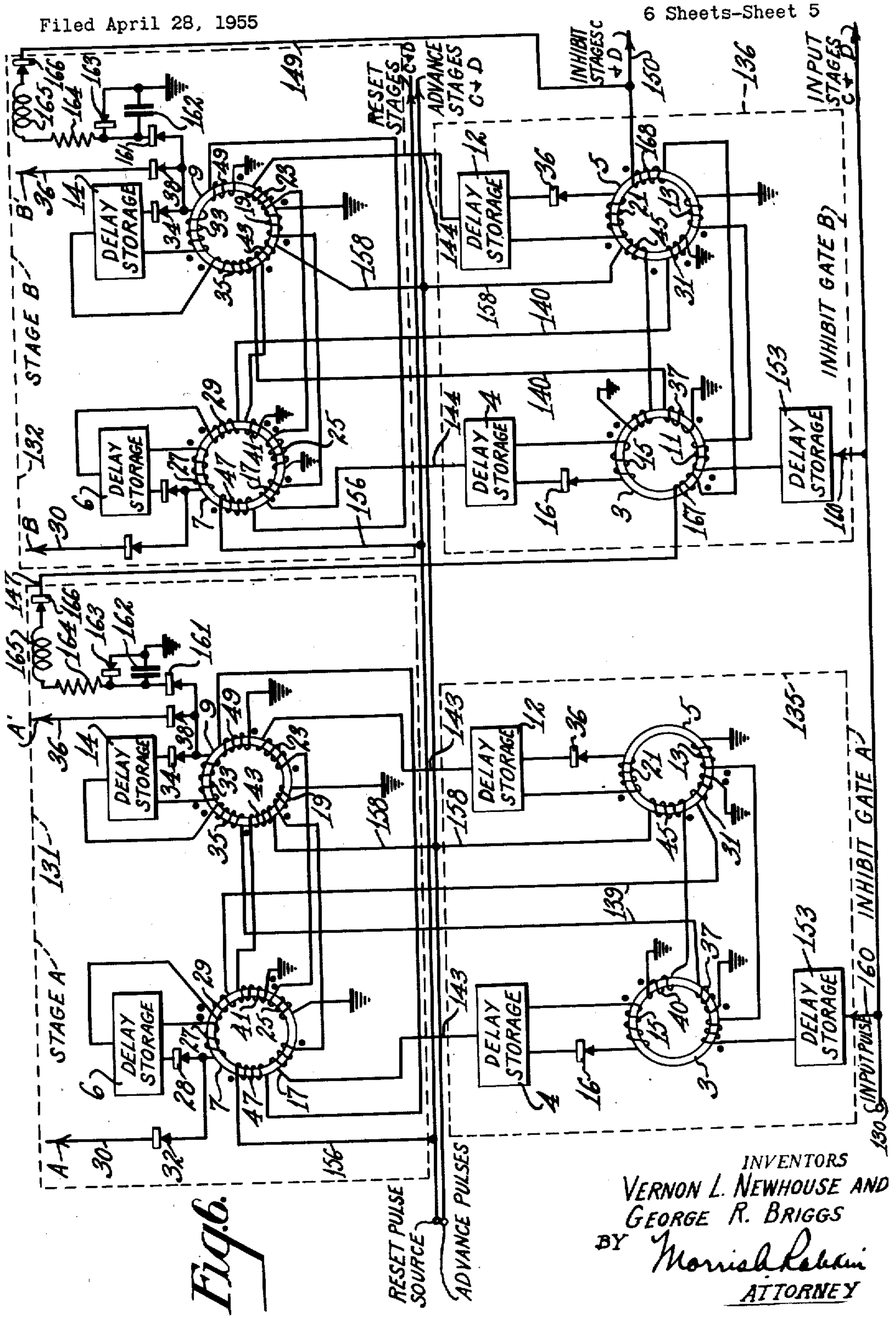
Figure 7:
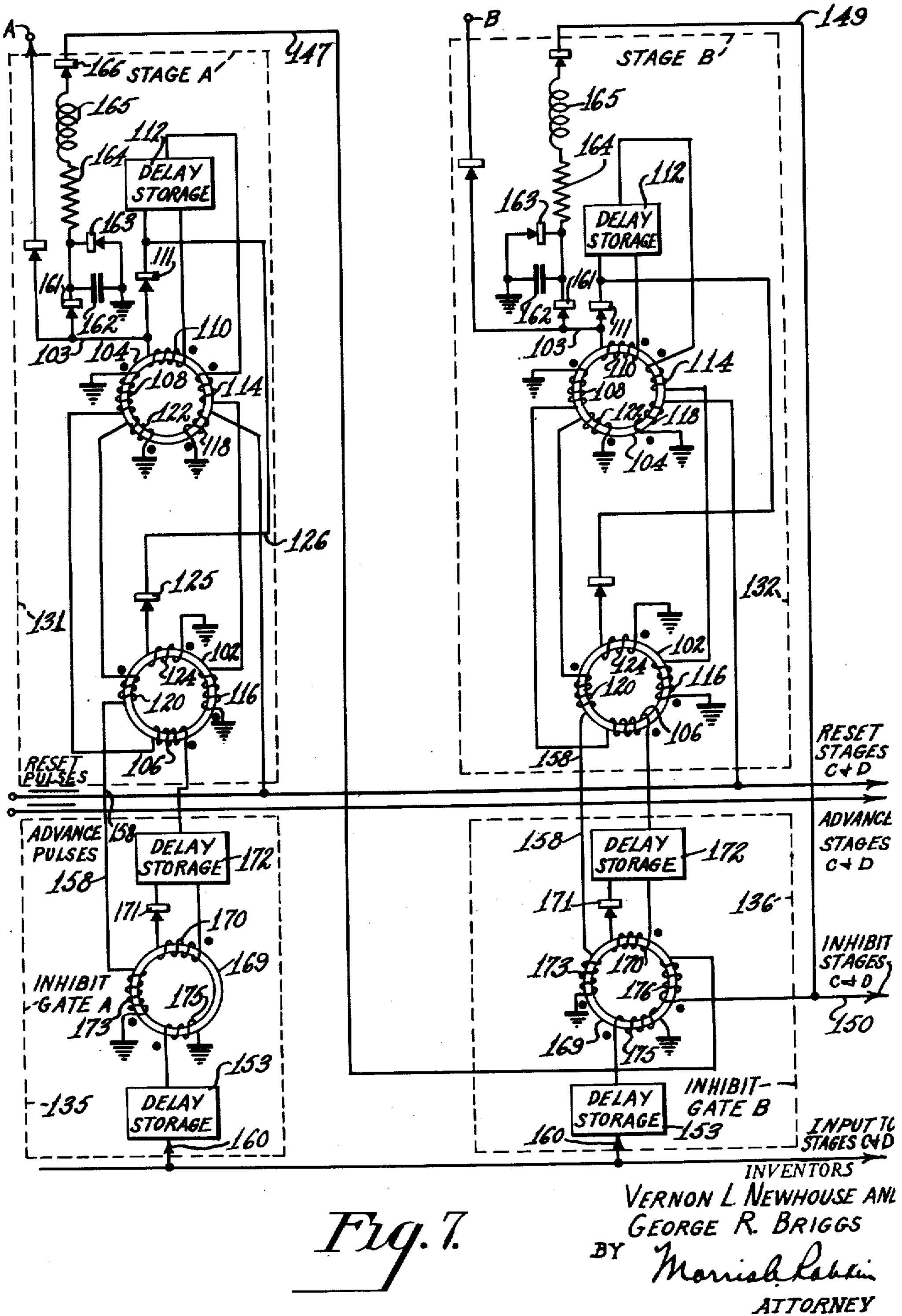

The invention will be more fully understood, both as to its organization and method of operation, from the following description when read in connection with the accompanying drawing wherein similar reference members are used to designate like parts and in which:

Fig. 1 is a schematic diagram of one embodiment according to the invention employing four magnetic cores, Fig. 2 is a graph, somewhat idealized, of the hysteresis loop for "rectangular" magnetic material, Fig. 3 is a schematic diagram of an embodiment of the invention which employs three magnetic cores, Fig. 4 is a schematic diagram of the other embodiment of the invention which employs two magnetic cores, Fig. 5 is a schematic diagram of the general arrangement of a binary counter according to the invention, Fig. 6 is a more detailed diagram of one embodiment providing a pair of complementary outputs for each stage of the counter, and Fig. 7 is a schematic diagram of another embodiment providing one output for each stage of the counter.

Referring to Fig. 1, a single flip-flop circuit 10 includes the cores 3, 5, 7 and 9. Each of the cores is fabricated from a magnetic material characterized by a substantially "rectangular" hysteresis loop. Certain materials such as molybdenum-permalloy and manganese-magnesium ferrite exhibit the desired rectangular hysteresis loop. The cores used in practicing the invention may be toroidal in shape. A hysteresis loop, somewhat idealized, for a rectangular magnetic material is shown in Fig. 2. Each core has two remanent conditions of magnetic induction in which the core exhibits substantial flux saturation. One remanent condition corresponds to a flux substantially oriented in one direction, and the other condition corresponds to flux substantially oriented in an opposite direction. In a toroidal core, for example, these directions may be taken along the center circular line of the figure of revolution. The one direction of magnetization is arbitrarily designated the "P" direction and the other direction of magnetization is designated the "N" direction. Substantially no flux change is produced when a core is driven further into saturation along a horizontal portion of the hysteresis loop. A magnetizing force in one direction, greater than the coercive force $+Hc$, is required to change the magnetization of the core from the N direction to the P direction. Similarly, a magnetizing force in the other direction, greater than a coercive force $-Hc$, is required to change a core back to the N direction.

In Fig. 1, an input pulse source 8 is connected in series to a pair of input windings 11 and 13 which are linked to the cores 3 and 5, respectively. The relative sense of linkage of a winding to a core is indicated in the drawing by a dot adjacent one of its terminals in accordance with the usual transformer convention. Thus, a positive current of increasing amplitude flowing into a dot-marked terminal produces, or tends to produce, a change of flux in a given direction taken herein as the P direction, in the linked core. Current of increasing amplitude flowing into an unmarked terminal produces, or tends to produce, a change of flux in the opposite direction, the N direction, in the core. Conversely, a change of flux in the core from one direction P to the other direction N induces a voltage in each winding coupled thereto, the polarity of which is such that the marked terminal is negative relative to the unmarked terminal; and for a flux change from the N direction to the P direction, the polarity of the induced voltage is reversed.

An output winding 15 linking the core 3 is coupled through a diode 16 to a delay storage means 4. The diode 16 is poled to pass a positive current into the delay storage means 4. The delay storage means 4 includes a temporary storage means such as a condenser 20 connected in shunt between the cathode of the diode 16 and a common ground, indicated by the conventional ground symbol. A resistor 22 and an inductance 24 are connected in series to the cathode of the diode 16. The output of the delay storage means 4 is connected in series to an inhibit winding 17, linking the core 7, and an input winding 19, linking the core 9, to ground. An output winding 21, linking the core 5, is connected to a delay storage means 12 through a diode 26 poled to pass a positive current, into the delay storage means 12. The delay storage means 12 and each of the remaining delay storage means herein are similar to the delay storage means 4. The output of the delay storage means 12 is connected in series to an inhibit winding 23, linking the core 9, and an input winding 25, linking the core 7, to ground. An output winding 27, linking the core 7, is connected to a delay storage means 6 through a diode 28 poled to pass a positive current into a delay storage means 6. A first output lead 30 is connected to a junction between the diode 28 and one terminal of the output winding 27. A diode 32 is interconnected in the output lead 30 between the above-mentioned junction and a capacitor 42 connected in shunt between the output lead 30 and ground. A voltage induced in the output winding 27 positive at the junction terminal is passed in the forward direction through the diode 32 to appear across the capacitor 42. The output of the delay storage means 6 is connected through a series circuit of a feedback winding 29, linking the core 7, and an inhibit winding 31, linking the core 5, to ground.

An output winding 33, linking the core 9, is connected to a delay storage means 14 through a diode 34 poled to pass a positive current into a delay storage means 14. A second output lead 36 is connected to the junction between the diode 34 and one terminal of the output winding 33. A diode 38 is interconnected in the output lead 36 between the last-mentioned junction and a capacitor 44 connected in shunt between the output lead 36 and ground. A positive voltage induced in the output winding 33 causes a current flow through the diode 38 in a forward direction to charge the capacitor 44. The output of the delay storage 14 is connected through a series circuit of a feedback winding 35, linking the core 9, and an inhibit winding 37, linking the core 3, to ground.

An advance pulse source 39 is connected across four different, serially-connected advance windings 40, 41, 43 and 45 linking the cores 3, 7, 9 and 5, respectively. A reset pulse source 48 is connected in series to two reset windings 47 and 49 linking the cores 7 and 9, respectively. The input, the advance, and the reset pulse sources are each arranged to furnish current pulses of one polarity, in this example positive with reference to the ground potential, to the respectively coupled windings. The pulse sources each may include a known constant current source such as a pentode tube circuit. Other suitable pulse sources may be employed, if desired. For example, a suitable source may be a voltage source such as a delay storage means fed from another magnetic core. Alternatively, at suitable points, the advance pulse source 39 may be a different source furnishing a train of advance pulses.

Each input core delay storage means 4 and 12 operates to inhibit the return of the one driven output core 7 and 9 to the P direction and to drive the non-driven output core to the P direction.

Each output core delay storage means 6 and 14 operates to restore the one driven core 7 or 9 from the N to the P direction. The operation of this type of delay storage is described in greater detail in an article entitled, "Magnetic Switch Register Using One Core Per Bit," published by Kodis, Ruhman and Woo in Part 7 of the I. R. E. Convention Record 1953.

Briefly, the capacitor 20 of a delay storage means, such as the delay storage means 4, is charged by the positive output voltage induced in the connected output winding 15. The capacitor 20 begins to discharge through the series resistance 22, the series inductance 24, and the connected windings 17 and 19 to ground upon the termination of the advance pulse producing the charging voltage. The capacitor 20 is substantially discharged before the following advance pulse is applied. The inductance 24 aids in preventing the capacitor 20 from materially discharging before the termination of the advance pulse.

In operation, the advance pulse source 39 is activated to apply a first advance pulse to each advance winding to make the unmarked terminal positive. The advance windings are each wound, as indicated, so that the cores are then driven into saturation in the N direction of magnetization. Upon termination of the first advance pulse each core is then magnetized in the N direction.

After the first advance pulse, the reset pulse source 48 is activated. The current flow in the reset winding 47 drives the core 7 further into saturation in the N direction and the current in the reset winding 49 drives the core 9 from the N direction to the P direction of magnetization. The core 7 remains magnetized in the N direction without any substantial flux change. The flux change in the core 9 induces a voltage in the output winding 33 which is blocked by the diodes 34 and 38. The second advance pulse, applied by the advance pulse source 39, drives the core 9 from the P direction of magnetization to the N direction of magnetization, with a resultant substantial change of flux.

This flux change in the core 9 induces a voltage in the output winding 33 causing a current flow through the diode 34, thereby charging the capacitor of the delay storage means 14. The output voltage induced in the output winding 33 also causes a current flow through the diode 38 to the output lead 36, thereby charging the output condenser 44.

The charged capacitor of the delay storage means 14 discharges a positive pulse through the feedback winding 35 of the core 9 and the inhibit winding 37 of the core 3 to ground. The feedback pulse drives the core 9 from the N direction back to the P direction of magnetization. Again the flux change in the core 9 induces a voltage in the output winding 33 which is blocked by the diodes 34 and 38. The inhibit winding 37 of the core 3 is wound so that the core 3 is driven further into saturation in the N direction of magnetization. The core 3, therefore, remains magnetized in the N direction.

A similar effect occurs for each subsequent advance pulse with the core 9 being driven from the P to the N direction of magnetization by each advance pulse and return back to the P direction by the capacitor of the delay storage means 14 discharging through the feedback winding 35. Thus, in this stable state, the application of a train of advance pulses produces a train of output pulses on the output lead 36.

Each input pulse from the input pulse source 8 is applied during the time interval when the one charged capacitor of the delay storage means 6 and 14 is discharging. The correct timing of the input pulses can be insured by known synchronizing means (not shown) connected between the advance and the input pulse sources. For example, in digital computer applications, synchronizing can be achieved by clock pulses. When the first input pulse is applied by the input pulse source 8, a current flows in the input windings 11 and 13 of the cores 3 and 5. However, an inhibit current resulting from the discharge of the capacitor of the delay storage means 14 flows in the inhibit winding 37 of the core 3 at the same time. This inhibit current prevents the input pulse from changing the direction of magnetization of the core 3. The core 5, however, is driven from the N to the P direction of magnetization by the input pulse from source 8. The flux change in the core 5 induces a voltage in the output winding 21 which is blocked by the diode 26.

The next advance pulse following the first inhibit pulse drives both the cores 5 and 9 from the P to the N direction of magnetization. The voltage change in the output windings 21 and 33, respectively, charge the capacitor of the coupled delay storage means 12 and the capacitor of the delay storage means 14. Both capacitors begin discharging at the same time, the former through the inhibit winding 23 of the core 9 and the input winding 25 of the core 7 and the latter through the feedback winding 25 of the core 9 and the inhibit winding 37 of the core 3. The inhibit current in the inhibit winding 23 prevents the feedback current from returning the core 9 to the P direction. The core 7, however, is excited from the N to the P direction by the input current in its input winding 25.

Accordingly, subsequent advance pulses, now drive the core 7 from the P to the N direction, whereas the advance pulses now drive the core 9 further into saturation in the N direction. The resulting flux change in the core 7 induces a voltage in the output winding 27 which is passed by the diodes 28 and 32 to the delay storage means 6 and the output capacitor 42. The capacitor of the delay storage means 6 discharges through the feedback winding 29 of the core 9 and the inhibit winding 31 of the core 5. The current flow in the feedback winding 29 now returns the core 7 back to the P direction of magnetization. The change of flux in the core 7 induces a voltage in the output winding 27 which is blocked by the diodes 28 and 32. The current flow in the inhibit winding 31 magnetizes the core 5 toward the N direction. Subsequent advance pulses produce a similar effect. In this stable state, then, a train of advance pulses produces a train of output pulses on the output lead 30.

A new input pulse triggers the flip-flop circuit back to the first stable state. Now, the core 5 is inhibited from changing its direction of magetization by the current flow in the inhibit winding 31. However, the core 3 is excited from the N direction to the P direction of magnetization by the current flow in the input winding 11. The resulting change of flux in the core 3 induces a voltage in the output winding 13 which is blocked by the diode 16.

The following advance pulse excites both the cores 3 and 7 from the P direction to the N direction of magnetization. The resulting voltages induced in the output windings 15 and 27 charge the capacitors of the delay storage means 4 and 6, respectively. The capacitor of the delay storage means 6 discharges through the feedback winding 29 of the core 7 at the same time that the capacitor of the delay storage means 4 discharges through the inhibit winding 17. Accordingly, the core 7 remains magnetized in the N direction. The current flow in the input winding 19 of the core 9 excites the core 9 from the N to the P direction of magnetization. Each subsequent advance pulse now produces an output signal on the output lead 36.

Each input pulse, therefore, triggers the system of Fig. 1 from the one to the other of its two stable states. In the one stable state the advance pulses produce output signals on the output lead 30. In the other stable state advance pulses induce output signals on the output lead 36. The output signals may be comprised of a train of periodic, or single, aperiodic pulses depending on whether the advance pulses are applied periodically or aperiodically. The output pulses may be applied to any utilization device responsive to such signals.

The temporary storage of the various delay storage means may be achieved by other known means. For example, additional magnetic cores may be employed. The use of magnetic cores for temporary storage is described in an article by An Wang entitled, "Magnetic Delay Line Storage," published in the Proceedings of I. R. E., volume 39, April 1951, pages 401–407. In such case, additional advance pulses may be applied to the temporary storage cores, to read out the stored signal to the corresponding cores of the system of Fig. 1. Another example of a suitable delay storage means includes a second diode oppositely polarized from those of Fig. 1 and replacing the inductance 24. In such case, biasing means may be provided to cut off the second diode during the application of the advance pulses.

In Fig. 3, there is shown a magnetic flip-flop comprising three magnetic cores 51, 53 and 55. An input pulse source 50 is connected through a series circuit of an input winding 52, linking the cores 51, an inhibit winding 54, linking the core 53, and an inhibit winding 56, linking the core 55, to a common ground. An output winding 58 linking the core 51 is connected to a delay storage means 61. A diode 59 is interposed between the unmarked terminal of winding 58 and the delay storage means 61. This diode 59 is poled to pass a positive current from the one winding terminal to the delay storage means 61. The output of the delay storage means 61 is connected through a series circuit of an input winding 62, linking the core 53, and an inhibit winding 64, linking the core 55, to ground.

An output winding 76, linking the core 53, is connected to a delay storage means 79. A diode 77 is interposed between the unmarked terminal of the winding 76 and the delay storage means 79 by connecting its anode to the unmarked terminal of the winding 76 and connecting its cathode to the delay storage means 79. The output of the delay storage means 79 is connected through a series circuit of a feedback winding 78, linking the core 53, an inhibit winding 80, linking the core 51, and an inhibit winding 82, linking the core 55, to ground. An output winding 68, linking the core 55, is connected to a delay storage means 83. A diode 81 is interposed between the unmarked terminal of the winding 81 and the delay storage means 83 in a manner described for the diode 77. The delay storage means 83 is shown in detail and is similar to the delay storage means 4 of Fig. 1. The output of the delay storage means 83 is connected to a feedback winding 66 linking the core 55.

A reset pulse source 90 is connected to a reset winding 84, linking the core 53, and a reset winding 86, linking the core 55. An advance pulse source 92 is connected in series with three advance windings 70, 72 and 74 linking the cores 51, 53 and 55, respectively, to the anode of a diode 87. The cathode of the diode 87 is connected to the junction between the capacitor 88 and a resistor 89 of the delay storage means 83.

A first output lead 93 is connected to the unmarked terminal of the output winding 76 linking the core 53. A diode 94 is interposed in the output lead 93 and has its anode connected to the unmarked terminal of the winding 76. An output capacitor 95 is connected between the output lead 93 and ground. A second output lead 97 is connected to the unmarked terminal of the output winding 68 of the core 55. A diode 98 is interposed in the output lead 97 and has its anode connected to the unmarked terminal of the winding 68. Another output capacitor 99 is connected between the output lead 97 and ground.

The operation of the system of Fig. 3 may be as follows: Assume that a train of advance pulses is applied to the advance windings by the source 92. The first advance pulse flows into the unmarked terminal of each advance winding and drives each of the cores to the N direction of magnetization. A first reset pulse applied by the source 90 may be non-coincident with any advance pulse and drives the core 53 from the N direction to the P direction of magnetization. The core 55 remains magnetized in the N direction. The first advance pulse following the reset pulse excites the core 53 from the P direction to the N direction of magnetization. The flux change in the core 53 induces a voltage in the output winding 76 in a direction to make its unmarked terminal positive. The resulting current flow charges the capacitor of the delay storage means 79. The current flow in the output winding 76 also charges the output capacitor 95. The capacitor of the delay storage means 79 discharges through the feedback winding 78 of the core 53, the inhibit winding 80 of the core 51 and the inhibit winding 82 of the core 55, to ground. The core 53 is thus returned to the P direction of magnetization by the feedback current. The advance pulse also charges the capacitor 88 through the diode 87. The discharge of the capacitor 88 is prevented from changing the magnetization of the core 55 due to the current flowing in the inhibit winding 82. The diode 81 blocks the advance pulse from the output winding 68. Each subsequent advance pulse, therefore, produces an output signal on the first output lead 93. Substantially no output signal is produced on the second output lead 97.

Assume, now, that while the capacitor of the delay storage means 79 is discharging, an input pulse is applied by the input pulse source 50. The current flow in the input winding 52 is prevented from changing the magnetization of the core 51 by the inhibit current flowing in the inhibit winding 80. Likewise, the current flow in the inhibit winding 54 of the core 53 prevents the feedback current flowing in the feedback winding 78 from returning the core 53 to the P direction of magnetization. Accordingly, the core 51 and the core 53 remain magnetized in the N direction. Thus, each of the cores is now magnetized in the N direction.

The next advance pulse, following the first input pulse, is passed by the diode 87 to charge the capacitor 88. The capacitor 88 discharges through the feedback winding 66 of the core 55 and drives the core 55 from the N to the P direction of magnetization.

A subsequent advance pulse changes the core 55 from the P direction to the N direction of magnetization. The change of flux in the core 55 induces a voltage in the output winding 68, thereby charging the capacitor 88 of the delay storage means 83 and the output capacitor 99. The capacitor 88 then discharges through the feedback winding 66 to return the core 55 back to the P direction of magnetization. Accordingly, in this stable state each advance pulse produces an output signal on the output lead 97.

The flip-flop circuit can be triggered to its other stable state by applying another input pulse from the input pulse source 50 during the discharge of the capacitor 88. For example, an input pulse from the source 50 drives the core 51 from the N to the P direction of magnetization. The current flow in the inhibit winding 56 prevents the feedback current in the winding 66 from returning the core 55 from the N to the P direction. The following advance pulse drives the core 51 from the P direction to the N direction, thereby charging the capacitor of the delay storage means 61. This advance pulse also charges the capacitor 88 of the delay storage means 83. The capacitor of the delay storage means 61 discharges through the input winding 62 of the core 53 and the inhibit winding 64 of the core 55. Thus, the core 53 is charged from the N direction to the P direction of magnetization. The inhibit current flowing in the inhibit winding 64 prevents the feedback current resulting from the discharge of the capacitor 88 from driving the core 55 to the P direction. Now, each subsequent advance pulse changes the direction of magnetization of the core 53 and an output signal is furnished on the output lead 93.

Thus, by applying one input pulse from the source 50, the flip-flop circuit is triggered from either of its stable states to the other. In one stable state output signals are furnished on the lead 93 and in the other stable state output signals are furnished on the output lead 97.

Note that the feedback winding 66 of the core 55 is used in changing the flip-flop from the one to the other stable state. Thus, the feedback winding 66 can be considered as an input winding. A second input pulse source (not shown) can be connected to the anode of the diode 87 to apply input pulses to the winding 66. In such case the marked terminal of the advance winding 74 would be grounded to disconnect the advance pulses from the winding 66. The input pulses from the second input pulse source would be applied subsequent to those from the first input pulse source 50.

In Fig. 4 there is shown a flip-flop circuit employing only two magnetic cores 102 and 104. This flip-flop circuit is provided with a single output lead 103. In one stable state an output signal appears on the lead 103 charging an output capacitor 105 connected in shunt between the lead 103 and a common ground. In the other stable state no output signal appears on the output lead 103. Input pulses are applied by an input pulse source 101 through an input winding 106, linking the core 102, and through a series-connected inhibit winding 108, linking the core 104, to ground.

Reset pulses are applied by a reset pulse source to a reset winding 118 linking the core 104. An output winding 110, linking the core 104, is connected to a delay storage means 112. A diode 111 has its anode connected to the unmarked terminal of the winding 110 and its cathode connected to the delay storage means 112. The output of the delay storage means 112 is connected in series with a feedback winding 114, linking the core 104, and an inhibit winding 116, linking the core 102, to ground. The unmarked terminal of an output winding 124 of the core 102 is connected to the anode of the diode 125 and the other marked terminal is connected to ground. A conductor 126 connects the cathode of the diode 125 to the output lead 103. A conductor 127 connects one terminal of the conductor 126 to a junction between the cathode of the diode 111 and the input of the delay storage means 112. An advance pulse source 119 is connected through a series circuit of a pair of advance windings 120 and 122 linking the cores 102 and 104, respectively, to ground.

One manner of operating the flip-flop circuit may be as follows: A train of advance pulses is applied by the advance pulse source 119 to the unmarked terminal of each advance winding. Each advance pulse drives the cores 102 and 104 into saturation in the N direction. Assume, for the moment, that the cores 102 and 104 are both magnetized in the P direction. The first advance pulse then produces a flux change in both the cores 102 and 104, thereby charging the capacitor of the delay storage means 112.

During the discharge of the capacitor of the delay storage means 112, the reset pulse source 117 is operated and a reset current flows in the reset winding 118. The reset current prevents the current in the feedback winding 114 from returning the core 104 to the P direction. The core 102 also remains magnetized in the N direction. The reset pulse has a similar effect if only one of the cores is initially magnetized in the P direction. Thus, the reset pulse insures that the flip-flop assumes a standard initial state with both cores magnetized in the N direction. In this stable state the flip-flop circuit does not produce any output signal on the output lead 103 in response to advance pulses.

Assume, now, that a first input pulse is applied by the input pulse source 101. The input current flowing into the marked terminal of the winding 106 drives the core 102 to the P direction of magnetization. The voltage induced in the output winding 124 is blocked by the diode 125. The next advance pulse drives the core 102 to the N direction. The output voltage induced in the output winding 124 during the advance pulse causes a current flow that charges the output capacitor 105 and the capacitor of the delay storage means 112. When the capacitor of the delay storage means 112 discharges, the core 104 is driven from the N to the P direction of magnetization by the current flow in the feedback winding 114. The core 102 remains magnetized in the N direction. Now, each subsequent advance pulse excites the core 104 from the P direction to the N direction of magnetization and an output signal is produced on the output lead 103. Therefore, in this stable state an output signal appears on the output lead 103 for each applied advance pulse.

Assume, that a second input pulse is applied to the input winding 106 and the inhibit winding 108 when the capacitor of the delay storage means 112 is discharging. The current flow in the input winding 106 is prevented from changing the direction of magnetization of the core 102 due to the inhibit current flowing in the inhibit winding 116. Likewise, the current flow in the feedback winding 114 is prevented from changing the direction of magnetization of the core 104 due to the current flow in the inhibit winding 108. Therefore, both cores are now magnetized in the N direction and substantially no output signal is produced by subsequent advance pulses. A new input pulse reverses the direction of magnetization of the core 104 as described above.

Referring now to Fig. 5 there is shown a schematic diagram of a binary counter 130 which avoids a "propagated carry." The counter 130, illustratively, has four different stages 131 through 134 and four corresponding inhibit gates 135 through 138. The four different stages are designated as stages A through D, respectively, and the four inhibit gates are correspondingly designated as inhibit gates A through D. Each of the stages of the counter are similar and has two stable states and two corresponding outputs A, A′, B, B′, etc. A reset pulse source 155 is connected by means of reset leads 156 to each of the stages.

An input pulse source 159 is connected to each inhibit gate by means of the input leads 160. One output of the first stage A is applied to each succeeding inhibit gate B, C and D by connecting a lead 147 to the inhibit gate B, joining the lead 147 to a lead 150 connected to the inhibit gate C, and joining the lead 150 to one terminal of a lead 152 connected to the inhibit gate D. The other terminal of the lead 152 is grounded. One output of the second stage B is connected to the inhibit gates C and D by means of a lead 149 connected in parallel with the lead 147 to the lead 150. One output of the stage C is connected to the inhibit gate D by means of a lead 151 connected in parallel with the lead 150 to the lead 152. Each stage has an inhibit output connected to a corresponding inhibit gate by one of the leads 139 through 142. Also, each inhibit gate has an output lead connected to the corresponding stage by one of the leads 143 through 146. An advance pulse source 157 is connected by means of the advance leads 158 to each of the counter stages A through D and to each inhibit gate A through D.

In operation, the reset pulse source 155 is activated; the current flow in the reset leads 156 sets each of the stages A through D to one stable state representing a zero count. A train of advance pulses is applied by the advance pulse source 157 to the advance leads 158. When a zero count is set into the counter, each advance pulse produces a voltage output on each primed output lead and a voltage on each of the leads 147, 149 and 151 interconnecting the stages. The voltage on the respective interstage connecting leads 147, 149 and 151 prevents each of the inhibit gates B, C and D from furnishing an output to a corresponding stage. Input pulses are applied by the source 159 during the time interval when a voltage appears on the interstage connecting leads. The proper timing may be assured by suitable synchronizing means (not shown) connected to the input pulse source and the advance pulse source.

The first input pulse is passed by the inhibit gate A to the stage A but is blocked by each of the remaining inhibit gates B, C and D. The stage A is triggered to its other stable state and furnishes a relatively high voltage on the output A when the advance pulses are applied. The counter represents a count of one when a voltage appears at the A output and at the B′, C′ and D′ outputs. No voltage appears on the connecting lead 147 and the inhibit gate B is opened.

The second input pulse is passed by the inhibit gates A and B to the stages A and B, respectively. The stage A is triggered back to its one stable state and the stage B is triggered to its other stable state. A voltage appears at the B output and the A′, C′ and D′ outputs when advance pulses are applied. Thus, a count of two is represented in the counter. No voltage appears on the connecting lead 149 when the stage B is triggered to its other stable state. However, a voltage appears on the lead 147 and inhibits the gates B, C and D.

A third input pulse is passed only by the inhibit gate A and triggers the stage A to its other stable state. Advance pulses produce a voltage at the A and B outputs and the C′ and D′ outputs. The counter then represents a count of three. The inhibit gate C is now open due to the absence of a voltage on the connecting leads 147 and 149.

A fourth input pulse is passed by the inhibit gates A, B and C. Both the stages A and B are triggered back to the one stable state and the stage C is triggered to its other stable state. Subsequent advance pulses produce a voltage at the C output and an output at the A′, B′ and D′ outputs. Now a count of four is represented in the counter.

Each succeeding input pulse continues to advance the counter one count in a similar manner. Each advance pulse produces a voltage on one or the other of the two outputs of each stage in accordance with the number of input pulses previously applied. The propagated carry is avoided and an indication can be obtained without having to wait for successive stages to trigger, as in many prior-art counters.

The output voltages furnished at the respective outputs can be applied to any suitable decoding circuit in order to obtain a single output for each different combination of output voltages. Also, visual means, such as a neon tube indicator, can be connected in each of the unprimed output leads. Certain ones of the neon tube indicators are ignited by advance pulses and a continuous indication of the stored count is thus obtained.

Fig. 6 is a detailed drawing of the first two stages A and B of the counter of Fig. 5. The four-core flip-flop circuit of Fig. 1 is employed in this embodiment to provide the two outputs for each stage. The cores 3 and 5 serve as the inhibit gate A and the cores 7 and 9 serve as the stage A. The one output A′ is connected to the output lead 36 and the other output A is connected to the output lead 30. The output winding 33 of the core 9 has its unmarked terminal connected to the anode of a diode 161. The cathode of the diode 161 is connected to a delay storage means comprising a shunt capacitor 162, a series resistor 164 and a series inductance 165. A bypass diode 163 is connected in shunt with the capacitor 162 by connecting the cathode of the diode 163 to a junction between the capacitor 162 and the resistor 164 and connecting the anode of the diode 163 to ground.

One terminal of the connecting lead 147 is connected to the cathode of a blocking diode 166. The anode of the diode 166 is connected to one terminal of the inductance 165. The other terminal of the lead 147 is connected in series with the inhibit windings 167 and 168 linking the cores 3 and 5, respectively, of the second inhibit gate B. The connecting lead 147 of the stage A and the connecting lead 149 of the stage B are connected in parallel to the lead 150. The lead 150 is connected in series with the inhibit windings 167 and 168 of the cores 3 and 5, respectively, of the inhibit gate C. The blocking diodes 166 prevent a voltage appearing on a connecting lead from feeding back to preceding stages. The shunt diodes 163 bypass to ground any leakage currents that are passed by the blocking diodes 166, thereby preventing leakage currents from charging the storage capacitor 162. Input pulses appearing on the input leads 160 are passed through a delay storage means 153 to the input windings 11 and 13 of the cores 3 and 5, respectively. The delay storage means 153 are similar to those previously described. The capacitors of the delay storage means 153 discharge at the same time as the capacitors of the delay storage means of the stages A through D.

The operation of the four-core flip-flop circuit is the same as described for Fig. 1. When a core 9 is magnetized to the P direction, each advance pulse produces an output voltage on the primed output lead 36. The resulting current charges the capacitor of the delay storage means 14 and the capacitor 162. Each core 9 is then returned to the P direction by the feedback current and the core 3 of the corresponding inhibit gate is inhibited. The discharge of the capacitor 162 inhibits each of the cores 3 and 5 of each suceeding inhibit gate. The first input pulse drives the core 5 of the inhibit gate A to the P direction. The next advance pulse returns the core 5 to the end direction. The output of the core 5 inhibits the return of the core 9 of the stage A to the P direction and drives the core 7 to the P direction. Subsequent advance pulses produce an output voltage on the unprimed A output lead 30. Now the core 5 of the inhibit gate A and the core 3 of the inhibit gate B are inhibited.

The next input pulse drives the core 3 of the inhibit gate A and the core 5 of the inhibit gate B to the P direction. The next advance pulse returns these cores to the N direction. The output of the core 3 of the inhibit gate A inhibits the return of the core 7 of the stage A to the P direction and drives the core 9 of the stage A to the P direction. The output of the core 5 of the inhibit gate B inhibits the return of the core 9 of the stage B to the P direction and drives the core 7 of the stage B to the P direction. Subsequent advance pulses produce an output on the lead 30 of the stage B. The count is advanced one count for each input pulse in a similar fashion.

Fig. 7 is a detailed diagram of two stages A and B of a counter circuit which provides one output lead for each stage. One two-core flip-flop circuit of Fig. 4 is employed for each of the stages A through D. One stable state of a stage is represented by a voltage appearing on the output when advance pulses are applied. In the other stable state no voltage appears on the output when advance pulses are applied.

Each of the inhibit gates A through D has a single core 169. Input pulses are passed over the input leads 160 to the delay storage means 153. The output of a delay storage means 153 is applied to the input winding 175 of each corresponding core 169. A current flow from the unmarked terminal of an output winding 170 of a core 169 is passed through a diode 171, to a delay storage means 172. The output of a delay storage means 172 is applied to the input winding 106 of the corresponding flip-flop stage. A different one of the advance leads 158 is connected to an advance winding 173 of each core 169.

The interconnection of the stages is the same as that described for Fig. 6. The connecting lead 147 is connected to an inhibit winding 176 of the core 169 of the B inhibit gate 136, and is then connected, in parallel with the connecting lead 149 of the stage B, to the lead 150. The lead 150 is connected in series with the inhibit winding 176 of the core 169 of the C inhibit gate, and so on.

In operation, a zero count may be represented by resetting each of the cores 104 to the P direction. Each advance pulse then produces an output voltage on each output lead A through D. The first input pulse drives the core 169 of the inhibit gate A to the P direction. The current flowing in each of the inhibit windings 176 prevents the other cores 169 from being driven to the P direction. The next advance pulse produces a voltage on the output winding 170 of the inhibit gate A, thereby causing a current flow in the input winding 106 of the core 102 and the inhibit winding 108 of the core 104. The current flow in the input winding 106 is prevented from driving the core 102 to the P direction by the inhibit current flowing in its inhibit winding 116. The current flowing in the inhibit winding 108 prevents the feedback current from returning the core 104 to the P direction. Stage A is thus triggered to its other stable state. Subsequent advance pulses do not produce an output on the A output and a count of one is represented.

When the stage A is in the other stable state, the inhibit gate B is open. The second input pulse drives the core 169 of both inhibit gates A and B to the P direction. The next advance pulse drives the core 102 of the stage A to the P direction and triggers the stage B to its other stable state. A second advance pulse is used to drive the core 102 of the stage A to the N direction; the output of the core 102, in turn, drives the core 104 of the stage A to the P direction. Observe that two advance pulses are used to trigger the stage A back to the one stable state. Thus, each input pulse is followed by a pair of advance pulses before the counter displays the new count of two. The operation proceeds in a similar manner with each input pulse advancing the counter one count.

The propagated carry is also avoided in the counter arrangement of Fig. 7. However, the counter arrangement of Fig. 6 operates somewhat faster because each input pulse need be followed by only one advance pulse.

There has been described herein novel, magnetic flip-flop circuits. By applying one signal impulse, a flip-flop circuit can be triggered from either one of two stable states to the other. In the embodiment of Fig. 1 an output signal is produced on one or the other of two different output leads for each advance pulse. In the embodiment of Fig. 4 only one output lead is provided. The embodiment of Fig. 4 can be advantageously employed in switching circuits and in gating circuits wherein information is represented by the presence or absence of a voltage on a single output lead.

The novel counter circuits described herein are particularly advantageous in that a propagated carry is avoided. Although the embodiments of the counter circuits illustrate four stages, it is understood that, if desired, additional stages can be connected in cascade to the four stages described. The embodiment of Fig. 6 provides a binary counter having complementary outputs for each stage. The counter of Fig. 7 provides a single output for each stage. A visual indication of the stored count can be obtained by providing an indicating device for each of the stages.

While the detailed embodiments described herein have employed one arrangement of a delay storage means, it will be apparent to those skilled in the art that other known delay storage devices may be used.

What is claimed is:

1. A magnetic flip-flop characterized by two stable states comprising at least two magnetic cores each having two directions of magnetization, input windings respectively linking said cores in one sense, inhibit windings respectively linking said cores in the sense opposite the one sense, output windings respectively linking said cores, delay storage means connecting the output winding of a first one of said cores to the input winding of a second one of said cores and the output winding of said second core to the inhibit winding of said first core, and means for applying input pulses to said input winding of said firt core.

2. A magnetic flip-flop characterized by two stable states comprising at least three magnetic cores each having two directions of magnetization and each being linked by a different one of a plurality of input windings, a different one of a plurality of inhibit windings and a different one of a plurality of output windings, first delay storage means connecting the output winding of a first one of said cores to the input winding of a second one of said cores and to the inhibit winding of third one of said cores, and second delay storage means connecting the output winding of said second core to the inhibit winding of said first core.

3. A magnetic flip-flop characterized by two stable states comprising at least three magnetic cores each having two directions of magnetization and each being linked by a different one of a plurality of input windings, a different one of a plurality of inhibit windings and a different one of a plurality of output windings, first delay storage means connecting the output winding of a first one of said cores to the input winding of a second one of said cores and to the inhibit winding of a third one of said cores, second delay storage means connecting the output winding of said second core to the inhibit winding of said first core, and means for applying input pulses to the input winding linking said first core, said input pulses having a polarity tending to drive said first core to one of said directions of magnetization.

4. A magnetic flip-flop characterized by two stable states comprising at least three magnetic cores each having two directions of magnetization, one of said stable states corresponding to a first of said cores being magnetized in one of said directions and the remaining cores being magnetized in the other of said directions, the other of said stable states corresponding to a second of said cores being magnetized in said one direction and the remaining cores being magnetized in said other direction, means operable to drive each of said cores to the other of said directions of magnetization, means for returning the driven one of said first and second cores back to the one direction, and means for inhibiting the return of said driven one of said first and second cores to the one direction and for driving the other one of said first and second cores to the one direction.

5. A magnetic flip-flop characterized by two stable states comprising a first, a second and a third magnetic core, each of said cores having two directions of magnetization, one of said stable states corresponding to a first of said cores being magnetized in one of said directions and the remaining cores being magnetized in the other of said directions, the other of said stable states corresponding to a second of said cores being magnetized in said one direction and the remaining cores being magnetized in said other direction, means operable to drive each of said cores to the other of said directions of magnetization, means for returning the driven one of said first and second cores back to the one direction, and means for inhibiting the return of said driven one of said first and second cores to the one direction and for driving the other one of said first and second cores to the one direction.

6. A magnetic flip-flop characterized by two stable states comprising first and second input cores and first and second output cores, each of said cores having two directions of magnetization, said stable states corresponding to the one or the other of said output cores being magnetized in said one direction, means operable to drive both said cores from the one to the other of said directions of magnetization, means for returning the driven one of said output cores to said one direction, and means, including delay storage means, interconnecting said input and output cores for preventing the return of said driven output core to said one direction and for driving the other of said output cores to the one direction.

7. A magnetic flip-flop characterized by two stable states comprising first and second input cores and first and second output cores, a plurality of input windings each linking a different one of said cores, a plurality of inhibit windings each linking a different one of said cores and a plurality of output windings each linking a different one of said cores, first delay storage means connecting the output winding of said first input core to the inhibit winding of said first output core and the input winding of said second output core, second delay storage means connecting the output winding of said second input core to the input winding of said first output core and to the inhibit winding of said second output core, third delay storage means connecting the output winding of said first output core to the inhibit winding of said second input core, and fourth delay storage means connecting the output winding of said second output core to the inhibit winding of said first input core.

8. A magnetic flip-flop as recited in claim 7 including a reset winding linking said first output core and a reset winding linking said second output core.

9. A magnetic flip-flop as recited in claim 7 including a pair of feedback windings, each linking one of said first and second output cores, and means connecting said third delay storage means to said feedback winding linking said first output core, and means connecting said fourth delay storage means to said feedback winding linking said second output core.

10. A magnetic flip-flop as recited in claim 7 including means for applying input pulses to said input windings linking said first and second input cores.

11. A magnetic flip-flop characterized by two stable states comprising an input core and first and second output cores, an input winding linking said first output core, each of said cores being linked by an individual one of a plurality of inhibit windings and an individual one of a plurality of output windings, first delay storage means connecting the output winding of said input core to the input winding of said first output core and to the inhibit winding of said second output core, and second delay storage means connecting the output winding of said first output core to the inhibit winding of said input core and to the inhibit winding of said second output core.

12. A magnetic flip-flop as recited in claim 11 including a pair of feedback windings each linking one of said first and second output cores, means connecting said second delay storage means to said feedback winding linking said first output core, a third delay storage means, and means connecting said third delay storage means to the output and the feedback windings of said second output core.

13. A magnetic flip-flop as recited in claim 11 including a pair of reset windings each linking one of said first and second output cores.

14. A magnetic flip-flop as recited in claim 12 including a plurality of advance windings each linking one of said cores, means connecting said advance windings in series relation with each other, and means connecting said series connected advance windings in series relationship with said third delay storage means.

15. A magnetic flip-flop characterized by two stable states comprising first and second magnetic cores, each having two directions of magnetization, one of said stable states corresponding to said first core being magnetized in one of said directions and said second one being magnetized in the other of said directions, the other of said stable states corresponding to both said cores being magnetized in the other of said directions, means operable to drive both said cores to said other direction, means for returning said first core back to said one direction, and means responsive to an input pulse for inhibiting the return of said first core to said one direction when said flip-flop is in said one stable state, and for driving said second core to said other direction when said flip-flop is in said other stable state.

16. A magnetic flip-flop as recited in claim 15 including a reset winding linking said first core.

17. A magnetic flip-flop characterized by two stable states comprising first and second magnetic cores, an input winding, an output winding and an inhibit winding linking said first core, an input, an output and an inhibit winding linking said second core, first delay storage means connecting the output winding of said first core to the input winding of said second core and to the inhibit winding of said first core, and means connecting the input winding of said first core in series relationship with the inhibit winding of said second core.

18. A binary counter comprising a plurality of bistable stages, each of said stages having an input and at least one output, a plurality of inhibit gates each one of said inhibit gates corresponding to an individual one of said stages, each of said inhibit gates having a signal input, an inhibit input, and an output, means connecting the output of each of said stages to the inhibit inputs of succeeding inhibit gates, means connecting the output of each inhibit gate to the input of its corresponding stage, and means for applying an input pulse to the signal input of each of said inhibit gates at the same time.

19. A binary counter comprising a plurality of bistable stages, each of said stages having an input and first and second outputs, a plurality of inhibit gates each one of said inhibit gates corresponding to an individual one of said stages, each inhibit gate having a signal input, an inhibit input and an output, means connecting the second output of each stage to said inhibit input of each successive inhibit gate, means connecting the output of each inhibit gate to the input of a corresponding stage, and means for applying an input pulse to said signal input of each inhibit gate at the same time.

20. A binary counter comprising a plurality of bistable stages, each of said stages having an input and an output, a plurality of inhibit gates each one corresponding to an individual one of said stages, each of said inhibit gates having a signal input, an inhibit input and an output, means connecting the output of each stage to said inhibit input of each successive inhibit gate, means connecting the output of each inhibit gate to the input of a corresponding stage, and means for applying an input pulse to said signal input of each inhibit gate at the same time.

21. A binary counter comprising a plurality of bistable stages, each of said stages having an input and at least one output, a plurality of inhibit gates each one corresponding to an individual one of said stages, each of said inhibit gates having a signal input, an inhibit input and an output, means connecting the output of each stage to said inhibit input of each succeeding inhibit gate, means connecting the output of each inhibit gate to the input of a corresponding stage, means for applying a reset pulse to each stage to cause each stage to assume a preselected one of said states, and means for applying an input pulse to said signal input of each inhibit gate at the same time.

22. A binary counter comprising a plurality of magnetic core flip-flops, each of said flip-flops having two stable states and each having an input and at least one output, a plurality of magnetic core inhibit gates, each one of said inhibit gates corresponding to an individual one of said flip-flops, each of said inhibit gates having a signal input, an inhibit input and an output, means connecting the output of each flip-flop to said inhibit input of each succeeding inhibit gate, means connecting the output of each inhibit gate to the input of a corresponding flip-flop, and means for applying an input pulse to said signal input of each inhibit gate at the same time.

23. A binary counter comprising a plurality of magnetic core flip-flops, each of said flip-flops having an input and first and second outputs, a plurality of magnetic core inhibit gates each one of said inhibit gates corresponding to an individual one of said flip-flops, each inhibit gate having a signal input, an inhibit input and an output, means connecting the second output of each flip-flop to said inhibit input of each successive inhibit gate, means connecting the output of each inhibit gate to the input of a corresponding flip-flop, and means for applying an input pulse to said signal input of each inhibit gate at the same time.

24. A binary counter comprising a plurality of magnetic core flip-flops, each of said flip-flops having an input and an output, a plurality of magnetic core inhibit gates each one corresponding to an individual one of said flip-flops, each inhibit gate having a signal input, an inhibit input and an output, means connecting the second output of each flip-flop to said inhibit input of each successive inhibit gate, means connecting the output of each inhibit gate to the input of a corresponding flip-flop, and means for applying an input pulse to said signal input of each inhibit gate at the same time.

25. A binary counter comprising a plurality of bistable stages, each of said stages including first and second magnetic cores, each of said first and second cores having an input, an inhibit and an output winding linked thereto, a plurality of inhibit gates each one corresponding to an individual one of said stages, each of said inhibit gates including third and fourth magnetic cores, each third and fourth core having an input, an output, and first and second inhibit windings linked thereto, means, including delay storage means, connecting one output winding of each of said stages to the first inhibit windings of succeeding inhibit gates, means, including delay storage means, connecting the output winding of the third core of each inhibit gate to the input winding of said first core and the inhibit winding of said second core of each corresponding stage, means, including delay storage means, connecting the output winding of said fourth core of each inhibit gate to the inhibit winding of said first core and the input winding of said second core of each corresponding stage, means, including delay storage means, connecting the output winding of the first core of each stage to the second inhibit winding of the fourth core of each corresponding inhibit gate, means, including delay storage means, connecting the output winding of the second core of each stage to the second inhibit winding of the third core of each corresponding inhibit gate, and means for applying an input pulse to the input winding of said third and fourth cores of each of said inhibit gates at the same time.

26. A binary counter comprising a plurality of bistable stages, each of said stages including first and second magnetic cores, each of said first and second cores having an input, an inhibit and an output winding linked thereto, a plurality of inhibit gates, each inhibit gate corresponding to an individual one of said stages, each of said inhibit gates including a third magnetic core, each third core having an input winding, an output winding, and first and second inhibit windings linked thereto, means, including delay storage means, connecting the output winding of said first core of each of said stages to the first inhibit winding of said third core of succeeding inhibit gates, means, including delay storage means, connecting the output winding of said first core to the inhibit winding of said second core in the respective stages, means, including delay storage means, connecting the output winding of said third core of each inhibit gate to the winding of said second core and the inhibit winding of said first core of each corresponding stage, and means for applying an input pulse to the input winding of said third core of each of said inhibit gates at the same time.

References Cited in the file of this patent

UNITED STATES PATENTS

| | | |
|---|---|---|
| 2,654,080 | Browne | Sept. 29, 1953 |
| 2,708,722 | Wang | May 17, 1955 |
| 2,710,952 | Steagal | June 14, 1955 |

UNITED STATES PATENT OFFICE

CERTIFICATE OF CORRECTION

Patent No. 2,794,130 May 28, 1957

Vernon L. Newhouse et al.

It is hereby certified that error appears in the printed specification of the above numbered patent requiring correction and that the said Letters Patent should read as corrected below.

Column 13, line 4, for "firt" read -- first --; column 16, line 65, before "winding", first occurrence, insert -- input --.

Signed and sealed this 22nd day of October 1957.

(SEAL)
Attest:

KARL H. AXLINE

Attesting Officer

ROBERT C. WATSON
Commissioner of Patents